Dec. 3, 1968 R. BOUTELEUX 3,414,242
DEVICE FOR BALANCED HOMOGENIZATION OF AIR AND LIQUID
FUEL MIXTURES IN INTERNAL COMBUSTION ENGINES
Filed Dec. 30, 1966 4 Sheets-Sheet 1

INVENTOR.
René Bouteleux
BY
Sparrow and Sparrow
Attorneys

INVENTOR.
René Bouteleux
BY
Sparrow and Sparrow
Attorneys

Dec. 3, 1968 R. BOUTELEUX 3,414,242
DEVICE FOR BALANCED HOMOGENIZATION OF AIR AND LIQUID
FUEL MIXTURES IN INTERNAL COMBUSTION ENGINES
Filed Dec. 30, 1966 4 Sheets-Sheet 4

INVENTOR.
René Bouteleux
BY
Sparrow and Sparrow
Attorneys

United States Patent Office 3,414,242
Patented Dec. 3, 1968

3,414,242
DEVICE FOR BALANCED HOMOGENIZATION OF AIR AND LIQUID FUEL MIXTURES IN INTERNAL COMBUSTION ENGINES
René Bouteleux, 5 Rue Dulong, Rouen, France
Filed Dec. 30, 1966, Ser. No. 606,296
Claims priority, application France, Dec. 30, 1965, 44,343; May 23, 1966, 7,145; Nov. 22, 1966, 7,164
2 Claims. (Cl. 261—18)

ABSTRACT OF THE DISCLOSURE

A device for homogenizing the mixture of air and liquid fuel for an internal combustion engine for reducing the portion of unburnt motor fuel when the engine is idling. A ring-shaped groove and a diaphragm consisting of a perforated truncated cone surrounded by an equally cone-shaped cavity, the diaphragm located below the groove, air channels connecting the groove with the atmosphere.

---

The object of the present invention is a device to homogenize the mixtures of air and liquid fuel fed into internal combustion engines, and consequently to reduce the proportion of unburnt motor-fuel, and the formation of carbon monoxide. The unit comprises a chamber where the homogenization of the mixture takes place when the engine is idle running, and an elongated perforated diaphragm, with or without a bottom. This assembly carries out an intimate homogenization of the mixture when the engine is running at its normal operation speed. The device is fixed between the carburetor and the combustion chamber(s) of the engine, so as to carry out the homogenization before the mixture enters the combustion chambers. This ensures a better combustion without an excess of fuel, and eliminates or greatly reduces the evolution of carbon monoxide, the amount of which is brought back to between 0.01% and 0.3%. Besides, the device enables to reduce the fuel consumption by 10 to 20%, while regularizing the combustion temperature in one or more cylinders. The carburetor is a component the function of which is exclusively to ensure feeding of the combustion chambers with a mixture of air and fuel, without effecting any control of homogenization or dosage according to the various working conditions of the engine, nor does it ensure the necessary balance of combustion temperature in the cylinders.

Whilst when the engine is idle running the fuel consumption is low, the starting of a cold engine demands a very important excess of petrol, which produces a considerable amount of carbon monoxide and of unburnt fuel, caused by poor homogenization of the mixture, due to a lack of pressure of the air that combines with the fuel.

The inventor has discovered that a better homogenization of the air/fuel mixture can be obtained by fixing a device according to the invention, which can be placed between the carburetor and the combustion chamber(s) of the engine, and is capable of causing, by turbulence and depression, a homogenization that is nearly perfect, and a regularization of the air and fuel usages when the engine is idle running or subjected to acceleration or deceleration.

The homogenization device according to the invention consists in a flange which is internally perforated with a diameter that is equal or bigger as compared to the diameter of the outlet duct of the carburetor, this diameter being enlarged, near the end of the outlet duct of the carburetor, so as to form a homogenization chamber in which two diametrically opposed air channels emerge, the section of which can be adjusted by a screw, the aforesaid diameter of the flange forming, under the homogenization chamber, a seat for a perforated homogenization metal diaphragm in the shape of an open (or not) cone converging to the combustion chamber(s) of the engine, the above mentioned diaphragm being surrounded, on its portion that is inside the flange, by a space that comprises, in every transverse plane, a passage section equal at least to the sum of the passage sections of the diaphragm holes situated before the transverse plane in question.

The combustion chamber(s) of the engine is (are) in constant depression, which causes the intake of air under pressure into the carburetor. When the engine is idle running, a small amount of fuel enters the carburetor and is localized in the homogenization chamber of the flange. The throttle-valve being then closed, the pressure of the air that penetrates into the carburetor is too small to effect homogenization, but this defect is eliminated by the air ducts that emerge in the homogenization chamber and in which a suction is created.

This causes then a violet whirling motion in the homogenization chamber, and consequently a very intimate mixing of fuel and air. The mixture then goes through the diaphragm, where homogenization is still improved.

As the amounts of fuel and air are increased, which corresponds to a bigger and bigger opening of the throttle in the carburetor, the pressure of the air into the homogenization chamber through the adjustable section channels in the flange, is increased up to a certain point, effecting a perfect homogenization from slow speed up to normal operation medium speeds.

When the speed is still increased, which corresponds to a bigger intake of the mixture, the homogenization is lessened in the homogenization chamber and increased in the homogenization diaphragm. At high speeds, that is when the carburetor throttle is wide open, the diaphragm alone ensures the homogenization of the mixture.

As a mere example and to facilitate the understanding of the invention, a description is given below of the particular methods of realization of the invention, represented diagrammatically and in a non-limitative way on the attached drawing, on which:

Figure 1:
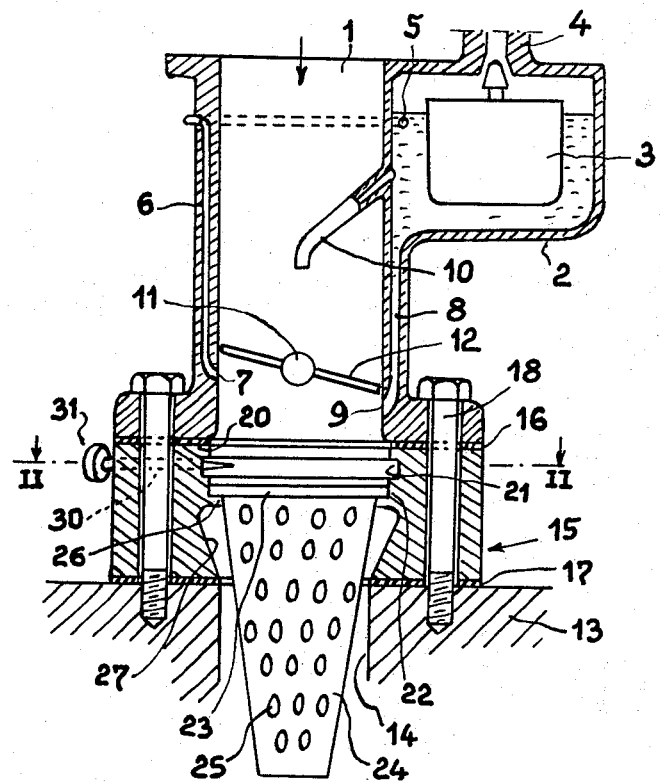
FIGURE 1 is a diagrammatic section of a carburetor, fitted with a flange, along line I—I of FIGURE 2.
Figure 2:
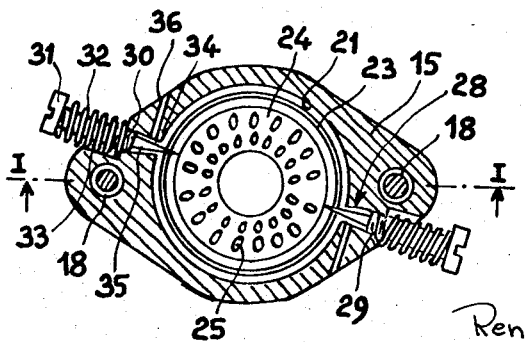
FIGURE 2 is a section of the flange along line II—II of FIGURE 1.
Figure 3:
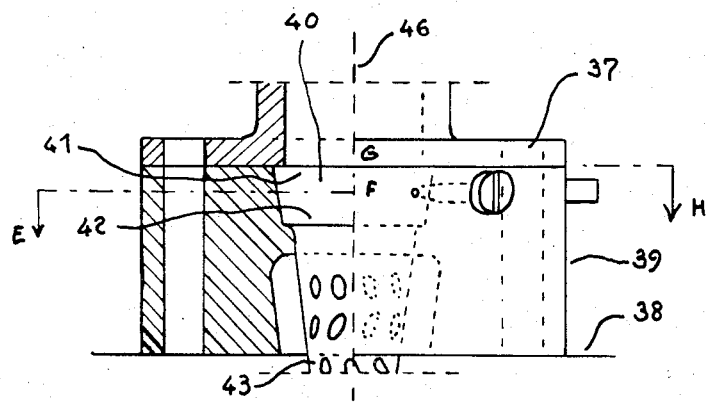
FIGURE 3 is a view, in partial cross and vertical sections along ABCD of FIGURE 4, of a device worked out according to the invention and fixed between the carburetor and the inlet of an engine.
Figure 4:
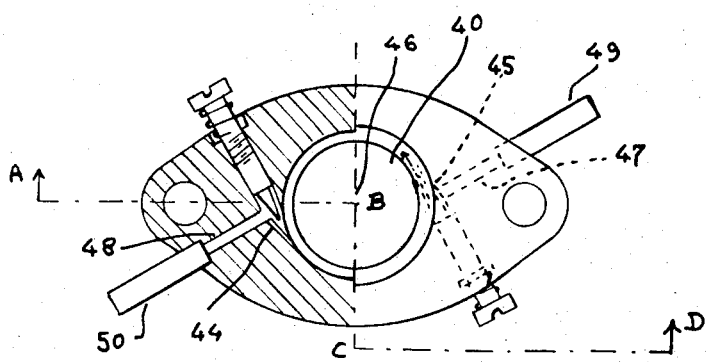
FIGURE 4 is a view, in partial cross and vertical sections, along EFGH of FIGURE 3, of this device, it being assumed that the carburetor has been removed.
Figure 5:
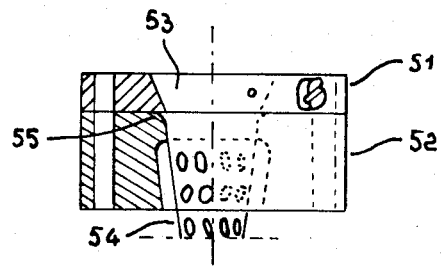
FIGURE 5 shows, in partial cross and vertical sections, a variant of this device.
Figure 6:
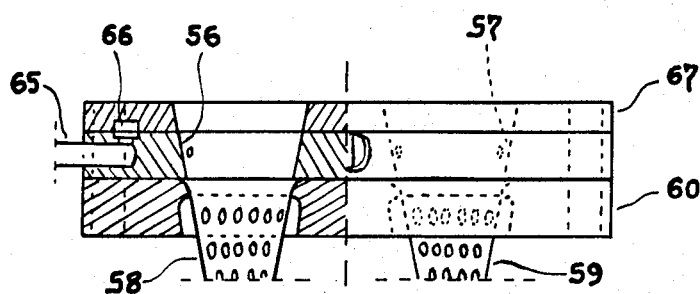
FIGURE 6 shows, in partial cross and vertical sections, along JKLM of FIGURE 7, another variant of this device, that can be set on a double body carburetor.
Figure 7:
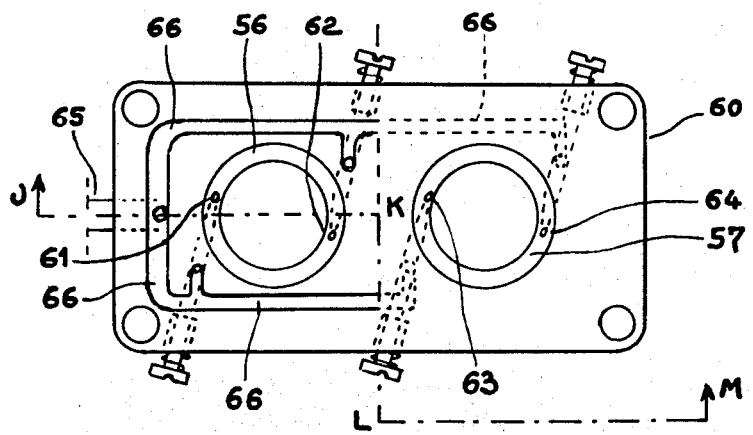
FIGURE 7 shows, in plan, this other variant.
Figure 8:
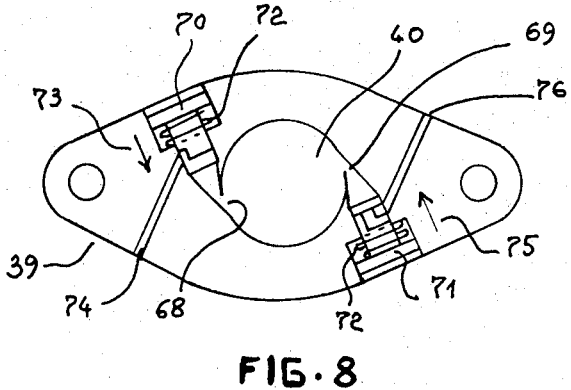
FIGURE 8 shows, in partial horizontal section, a homogenization chamber equipped with two air inlets, every one carrying an automatic device for adjusting the air intake, the device on one being different from the device on the other inlet.
Figures 9, 10:
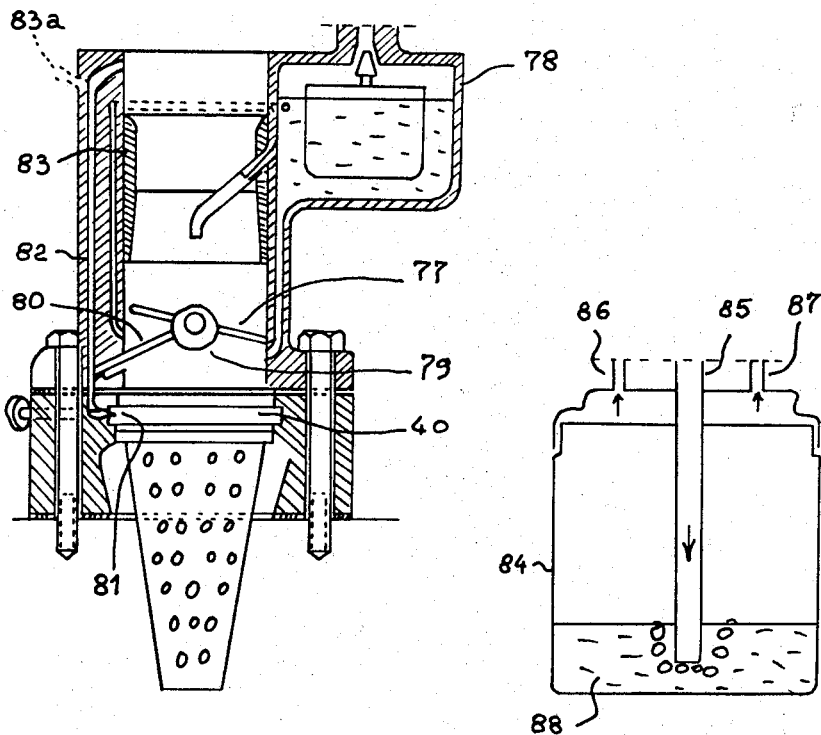
FIGURE 9 represents, in partial vertical section, a carburetor fitted with a homogenization chamber were the air admission is adjusted according to the position of the carburetor throttle.
FIGURE 10 is a vertical section of a device, according to the invention, that enables to perfume the exhaust fumes.

Referring to FIGURE 1, a way of setting the device according to the invention is shown with a very diagrammatically drawn carburetor on which 1 represents the central air and fuel admission duct and 2 a constant level carburetor float-chamber in which a float 3 is placed, that controls the admission and stoppage of fuel in chamber 2 through an inlet pipe 4. In 5, 6 and 7 the feed ports, the passage and jet of the circulation system for low speed operation respectively have been diagrammaticallly drawn. In 8 a communication passage from chamber 2 to the carburetor is shown. This passage ends with starting jet 9, and in 10 the mixing cone of the normal running jet.

In the carburetor channel 1, a throttle 12 is mounted so as to swivel on a transverse axle 11. This throttle 12 is placed above the idle running jet and the starting jet 7 and 9, and under the normal running jet 10.

In prolongation of the carburetor channel 1 is the port 14 of a combustion chamber 13 into which an air and fuel mixture is admitted, after going through a flange represented in a general way in 15. It is in this flange 15 that the homogenization of the mixture takes place.

Tight gaskets 16 and 17 are inserted between flange 15 and the carburetor on one part, and between the flange and the combustion chamber 13 on another, whilst screws 18 ensure fixation of the carburetor and of the flange on the jacket of the combustion chamber.

Flange 15 is drilled with an axial hole 20 of approximately the same diameter as carburetor duct 1. Near the interior end of carburetor duct 1, the flange hole 20 carries an annular groove 21 which constitutes a homogenization chamber for the air and fuel mixture.

Under the chamber or groove 21 a protruding shouldering 22 is constituted, which forms a seat on which rests the upper collar 23 of a metal diaphragm 24 in shape of truncated cone drilled with preferably oblong holes 25. The diaphragm is preferably hot set on its seat 22, and the edge 26 of the shouldering clamps diaphragm 24 under collar 23 which in turn is clamped by the flange on all its height. The diaphragm can be fixed by any other means, for instance through circlips and by setting.

Under shouldering 22, the insides of the flange offers a surface 27 in shape of a truncated cone converging to the inferior part, and separated from the surface of diaphragm 24. It will be noted that the section of passage of the space comprised between surface 27 and diaphragm 24, in a transverse plane which is normal to the axis of the diaphragm, is equal to, or bigger than, the sum of the sections of passages of the diaphragm holes 25 that are situated above the transverse plane in question, so that the fluid circulation is not disturbed.

Actually, the jet of fluid coming from the carburetor penetrates into the diaphragm where it is broken and homogenized. This atomization is improved due to the fact that a part of the fluid escapes through the holes 25 in the space comprised between the diaphragm and surface 27, and this at the same time ensures an easy circulation to combustion chamber 13.

Besides, flange 15 is drilled at the level of homogenization chamber 21, with two holes 28 which are diametrically opposed and extend radially from outside the flange to the axis of central hole 20 of the flange. The holes 28 emerge in the bottom of homogenization chamber 21.

The part of holes 28 which is near the outside of the flange, is tapped in 29 to accommodate, by screwing, a threaded part 30 of an adjust screw 31 for the air feeding of homogenization chamber 21. A stabilization spring 32 surrounds the part of screw 31 that comes out of the flange and is accommodated in a recess 33 worked in the flange. Every screw 31 is ended by a conical part 35 working with a conical seat 34 which ends holes 28, near the homogenization chamber 21. Thus, when screw 31 is screwed or unscrewed, its conical part 35 stops up or opens the aperture of hole 28 in chamber 21. At the level of conical seat 34, a channel 36 emerges into every hole 28 and this channel, substantially normal to hole 28, enables chamber 21 to be fed with air, screw 31 ensuring the adjust of the amount of air that comes in.

When the engine is idle running, throttle 12 is in the position shown on FIGURE 1 and the fuel comes into the carburetor through idle running jet 7 and goes down the walls 20 of the central hole of flange 15.

The depression which exists in combustion chamber 13 creates an intake of air through the channels 36 of the flange. The speed of the air that is admitted through the channels is about 40 times higher than the speed of the air which normally comes through the carburetor channel 1. The air, impelled with high speed, comes into chamber 21 where it is induced to swirl, carrying away as it passes the droplets of fuel which come down wall 20 in chamber 21.

The high speed circulation of air in chamber 21 atomizes the droplets of fuel and produces a perfectly homogenous and balanced mixture.

The homogenized mixture then goes into conical diaphragm 24 which still improves the homogenization, and then in combustion chamber 13 where the mixture is burnt.

The conical shape of the diaphragm gives a better direction to the mixture jet and exerts a damping action on the checking of the mixture.

It will be noted that to obtain a good dosage of the air and fuel mixture, all is to be done is to adjust once for all screws 31 that control the air admission into chamber 21. A balanced dosage of the mixture enables to have a better efficiency from the combustion, and to eliminate or significantly reduce the evolution of carbon monoxide. This adjustment is effected by throttling down the running engine, flange 15 having been put in position. A measuring apparatus is placed on the exhaust pipe and the flange screws 31 are screwed on until the apparatus indicates the minimum amount of carbon monoxide. So the device is adjusted.

When the engine is running at a slightly accelerated speed, throttle 12 opens and normal running jet 10 feeds the carburetor with fuel, while air, sucked in by the depression in combustion chamber 13, rushes through the upper part of central duct 1. The mixture is first carried away by the turbulence still prevailing in homogenization chamber 21 into which air coming from channels 36 still penetrates, but the circulation speed of the mixture jet enables chamber 21 to carry out partially only the homogenization of the mixture. The pre-homogenized jet then goes into diaphragm 24 where a more perfect homogenization is performed.

As the speed of the mixture jet is increased, which corresponds to a gradually wider opening of the throttle, and to a higher rotation speed of the engine, the homogenization effected by chamber 21 will grow less, and will take place totally in diaphragm 24.

It will be understood that the present description is not limitative, and that any additions or modifications could be brought about without departing from the invention, which must be interpreted in its broadest sense. Thus, although the homogenization device according to the invention is described and represented as a component that is distinct and separable from the carburetor, it will be understood that it would be possible to design a carburetor the base of which would include, directly molded on, the device according to the invention which would so be incorporated into the carburetor. The assembly would then consist in a component that would atomize at the utmost the fuel particles, and would be better balanced and more regular than a conventional carburetor.

As a variant, a flange 39 can be placed between the outlet flange of carburetor 37 and admission flange 38 into the combustion chamber(s) of the engine, that delimits in 40 a homogenization chamber the inside of which is in the shape of a truncated cone, and the biggest diameter 41 of which is facing the carburetor, and the smallest is facing the perforated diaphragm 43. Diaphragm 43 and flange 39 can be made with any suitable matter and especially plastic if temperatures allow.

Diameter 41 is equal to, or slighter bigger than, the passage diameter of carburetor flange 37, which enables to use one type of flange 39 for carburetors of different sections.

The communication of chamber 40 with the atmosphere is effected through the adjustable section channels 44, 45, symmetrically positioned in relation to the axis 46 of the flange and channels 47, 48. This communication is effected through a filter so as not to risk the blocking of the channels by dust or any foreign matter. To this effect, channels 47 and 48 are extended by pipings 49, 50, on which pipes connected with the engine air filter can be fixed. Channels 44, 45 can also be not symmetrical in relation to axis 46.

The adjustable channels 44, 45 are preferably directed so as to emerge in chamber 40, so producing air jets virtually tangent to a cross section of the chamber to cause further turbulence.

Flange 39 can be made in two parts, 51, 52 to be assembled, part 51 constituting in 53 the homogenization chamber, and part 52 carrying the homogenization diaphragm 54. Diaphragm 54 is held in position by a collar 55 and by the assembly of both parts 51 and 52.

In the case of a double bodied carburetor, the device is doubled and comprises two homogenization chambers 56, 57 and two diaphragms 58, 59. This assembly can be positioned in a flange 60 comprising the adjustable channels 61, 62, 63, 64 ensuring communication of chambers 56, 57 with the atmosphere. These channels are fed through an inlet 65 by a groove 66 covered by flange 67.

According to another variant, the homogenization chamber 40, arranged in flange 39, is fitted with inlets 68, 69, for the air jets, fitted in turn with an automatic device for air intake control. This control device can be a piston 70 or 71, brought back by a spring 72. In the illustrated example, piston 70, when moving along in the direction of arrow 73, tends to reduce the flow of the air that is admitted through channel 74, while piston 71, moving along in the direction of arrow 75, tends to increase the flow of the air that is admitted through channel 76. These arrangements are given solely as examples to show that pistons 70 or 71, subjected to the same pressure differences, can act in a contrary manner. Obviously flange 39 can be equipped with two pistons 70 and/or with two pistons 71. In the present example, pistons 70 and 71 are actuated by the difference between the ambiant pressure and the pressure that prevails in inlets 68 and 69. It is obvious that, with suitable connections, pistons 70 and 71 can be actuated by pressures which exist in other parts of the path of the gases admitted into the engine.

Instead of being automatic, the adjustment of the air jets intake into the homogenization chamber 40 can be effected according to the position of the air throttle 77 of the carburetor 78. For instance, a cam 79, driven by the axle of throttle 77, can act upon a needle 80 to obtain the required air intake from jets 81 of chamber 40. These jets are fed through a channel 82 worked out in the carburetor body and opening, for instance, before nozzle 83 of the carburetor. Channel 82 could also emerge outside the carburetor in 83a.

According to another improvement, a device is placed on the inlets of the air jets in the homogenization chamber, and it consists in a closed cylinder 84 fitted with an air inlet pipe 85 and two air outlets 86, 87, connected by pipes to channels 74 and 76, for instance. The lower part of air inlet pipe 85 is dipping in a liquid 88 such as a mineral oil. This device ensures filtering of the air admitted to the air jets. Besides, an odoriferous substance can be added to liquid 88. Experience shows that such a substance is capable, in these conditions, to perfume the engine exhaust gases, especially when the engine is idle running, during decelerations and at low speeds, when the depression created by chamber 40 in channels 74 and 76 is the most marked. The use of oil ensures a long service from the quantity of odoriferous substance introduced in cylinder 84, this substance being judiciously evaporated through the action of the homogenization chamber and its air jets.

The use of an oil as liquid 88 allows a transfer of lubricant into the engine.

The liquid 88 could also be replaced by another filtering stuff acting as a substrate for the odoriferous substance.

All the above mentioned dispositions can of course be incorporated into an engine or a carburetor instead of constituting one or more separate components.

The device described above enables to decrease considerably the amount of carbon monoxide present in the exhaust fumes. The reduction of this amount reaches 75% in normal running and 98% when the engine is idle running. It also results in a corresponding economy in fuel consumption.

It is obvious that the invention is not limited to the aforesaid methods of application and realization, and that it also comprises any of its variants.

What is claimed is:

1. Device for homogenizing the mixture of air and a liquid fuel, said mixture fed into an internal combustion engine from a carburetor having a throttle valve, said device comprising a homogenizing chamber consisting substantially of an annular groove communicating with the atmosphere by channels, a perforated cone-shaped homogenizing diaphragm below said chamber, both said chamber and said diaphragm arranged between said carburetor and said engine for passing said mixture in successive order through said chamber and said diaphragm, the cone of said diaphragm pointing toward said engine and away from said carburetor, said perforations having substantially oblong shapes, said diaphragm surrounded by a cone-shaped cavity below said annular groove, said cavity having a cross-section at least equal to the total sum of said perforations, at least two conical jets diametrically arranged on the periphery of said annular groove, said channels leading to said jets, and a cam on said throttle, said cam controlling the flow of air through said channels.

2. Device for homogenizing the mixture of air and a liquid fuel according to claim 1, and means for feeding an odoriferous substance into said channels.

References Cited

UNITED STATES PATENTS

| | | | |
|---|---|---|---|
| 1,035,651 | 8/1912 | Stewart. | |
| 1,264,221 | 4/1918 | Stransky | 123—124 |
| 1,486,555 | 3/1924 | Wikfeld | 48—180 |
| 1,551,041 | 8/1925 | Mercer. | |
| 1,894,847 | 1/1933 | Bergman | 48—180 |
| 2,078,481 | 4/1937 | Chanavier. | |
| 2,342,046 | 2/1944 | Greene. | |
| 2,518,082 | 8/1950 | Shively | 123—124 X |
| 2,541,129 | 2/1951 | Taber et al. | 261—23 X |
| 2,789,796 | 4/1957 | Mansfield. | |
| 3,151,604 | 10/1964 | Walker et al. | |

FOREIGN PATENTS

| | | |
|---|---|---|
| 330,932 | 6/1930 | Great Britain. |
| 380,716 | 9/1932 | Great Britain. |
| 354,309 | 11/1937 | Italy. |
| 457,971 | 1/1950 | Italy. |
| 507,128 | 12/1954 | Italy. |

HARRY B. THORNTON, *Primary Examiner.*

TIM R. MILES, *Assistant Examiner.*